US009803558B2

(12) United States Patent
Villanueva et al.

(10) Patent No.: US 9,803,558 B2
(45) Date of Patent: Oct. 31, 2017

(54) REDUNDANT VALVE SYSTEM

(71) Applicant: Dukes Aerospace, Northridge, CA (US)

(72) Inventors: Carlos Villanueva, Northridge, CA (US); Bill Lopez, Northridge, CA (US)

(73) Assignee: Dukes Aerospace Inc., Northridge, CA (US)

( * ) Notice: Subject to any disclaimer, the term of this patent is extended or adjusted under 35 U.S.C. 154(b) by 37 days.

(21) Appl. No.: 15/042,644

(22) Filed: Feb. 12, 2016

(65) Prior Publication Data

US 2016/0237915 A1 Aug. 18, 2016

Related U.S. Application Data

(60) Provisional application No. 62/115,948, filed on Feb. 16, 2015.

(51) Int. Cl.
*F02C 9/18* (2006.01)
*F16K 1/12* (2006.01)
*F16K 31/40* (2006.01)
*F16K 31/42* (2006.01)

(52) U.S. Cl.
CPC ............ *F02C 9/18* (2013.01); *F16K 1/12* (2013.01); *F16K 1/126* (2013.01); *F16K 31/406* (2013.01); *F16K 31/42* (2013.01); *Y02T 50/671* (2013.01); *Y10T 137/87917* (2015.04)

(58) Field of Classification Search
CPC .......... F02C 9/18; F16K 1/12; F16K 31/0655; Y10T 137/87917
USPC ....................................................... 137/613
See application file for complete search history.

(56) References Cited

U.S. PATENT DOCUMENTS

| 3,073,511 | A |   | 1/1963  | Knight et al. |
|-----------|---|---|---------|---------------|
| 3,848,636 | A |   | 11/1974 | McCombs |
| 4,041,695 | A |   | 8/1977  | Harper et al. |
| 5,031,661 | A | * | 7/1991  | Feuz ................. E03C 1/106 137/613 |
| 5,218,997 | A |   | 6/1993  | Dunwoody |
| 5,588,464 | A | * | 12/1996 | Tylosky .............. F16K 17/042 137/613 |

(Continued)

OTHER PUBLICATIONS

International Patent Application No. PCT/US2016/17685; Int'l Search Report and the Written Opinion; dated Apr. 7, 2016; 12 pages.

*Primary Examiner* — Kevin Lee
(74) *Attorney, Agent, or Firm* — Baker Hostetler LLP

(57) ABSTRACT

A redundant valve system to provide a regulated fluid flow includes a housing having an inlet at an inlet end which receives a pressurized fluid, and an outlet at an outlet end which provides the regulated fluid flow, a first piston assembly arranged in the housing having a first cavity, the first piston assembly configured to regulate the fluid flow, and a first fluid connection connected to the first cavity and to a point along the housing at the outlet end. The redundant valve system may further include a second piston assembly arranged in the housing downstream of the first piston assembly having a second cavity, the second cavity having a second fluid connection to a vent, an upstream valve to control the first fluid connection and control a position of the first piston assembly, and a downstream valve to control the second fluid connection and control a position of the second piston assembly.

20 Claims, 5 Drawing Sheets

(56) References Cited

U.S. PATENT DOCUMENTS

| | | | |
|---|---|---|---|
| 6,786,225 B1* | 9/2004 | Stark et al. | ............ F23N 1/007 |
| | | | 126/116 A |
| 2005/0044858 A1 | 3/2005 | Hooker et al. | |
| 2016/0237913 A1* | 8/2016 | Marocchini et al. | . F01D 17/105 |

* cited by examiner

REDUNDANT VALVE SYSTEM

CROSS REFERENCE TO PRIOR APPLICATIONS

This application claims the benefit from U.S. Provisional Application No. 62/115,948 filed on Feb. 16, 2015, which is hereby incorporated by reference for all purposes as if fully set forth herein.

BACKGROUND OF THE DISCLOSURE

Field of the Disclosure

The disclosure generally relates to an apparatus and method for a redundant valve system used to regulate bleed air from turbine engines. Specifically, the disclosure relates to a redundant valve system with two pressure regulating valves coupled and configured to reduce weight, reduce bulk, and increase reliability.

Related Art

Pressure regulating valves have applications in a wide variety of areas that use pressurized fluids to drive pneumatic systems. These systems typically require one or more pressure regulating valves controlled through electronic systems to permit operation remotely. One application for these pressure regulating valves are in aircraft systems that utilize a turbine engine.

Because these pressure regulating valves are used in critical functions of the aircraft, such as the de-icing of engine cowls, it is important to introduce redundant valves in the event one of the valves fails. It would be desirable to place two pressure regulating valves in series in order to provide a redundant valve system for de-icing of the engine cowls and the like. However, due to quick changes in pressure of the bleed air and the short distance between the valves in some prior art systems, the pressure gradient across the valves often fluctuates quickly. This rapid change in pressure may cause undesirable oscillation in operation of the valves and early failure of the valves. The industry solution to this problem has been to separate the valves using an extended duct of several feet in length (e.g., at least 4 feet in length). This increased distance between the valves allows the pressure gradient between the valves to be less susceptible to fluctuations in pressure. However, the introduction of an additional duct adds unnecessary weight, bulk, and parts in a pressure regulating system that needs to be compact and light weight.

Accordingly, there is a need for a redundant pressure regulating valve system that is resistant to oscillation of the valves while also being compact and light weight.

SUMMARY OF THE DISCLOSURE

There has thus been outlined, rather broadly, certain aspects of the disclosure in order that the detailed description thereof herein may be better understood and in order that the present contribution to the art may be better appreciated. There are, of course, additional aspects of the disclosure that will be described below and which will form the subject matter of the claims appended hereto.

In one aspect, a redundant valve system to provide a regulated fluid flow includes a housing having an inlet at an inlet end which receives a pressurized fluid, and an outlet at an outlet end which provides the regulated fluid flow, a first piston assembly arranged in the housing having a first cavity, the first piston assembly configured to regulate the fluid flow, and a first fluid connection connected to the first cavity and to a point along the housing at the outlet end. The redundant valve system may further include a second piston assembly arranged in the housing downstream of the first piston assembly having a second cavity, the second cavity having a second fluid connection to a vent, an upstream valve to control the first fluid connection and control a position of the first piston assembly, and a downstream valve to control the second fluid connection and control a position of the second piston assembly.

The redundant valve system may further include a regulator servo in fluid connection with the first cavity, and a regulator bellow in fluid connection with the regulator servo and the point along the housing at the outlet end, wherein the regulator servo may be actuated to control the regulator bellow. The redundant valve system may further include a relief valve in fluid connection with the second cavity. The vent may outlet to the atmosphere. The first piston assembly may further include an orifice, wherein the orifice fluidly connects the inlet and the first cavity. The housing may further include a third cavity between the first piston assembly and the second piston assembly. The second piston assembly may further include an orifice, wherein the orifice fluidly connects the second cavity and the third cavity. The upstream valve may be a solenoid operated valve. The downstream valve may be a solenoid operated valve. The redundant valve system may further include a controller configured to operate the downstream valve to control the second fluid connection and control a position of the second piston assembly, and the controller may be further configured to determine when the second piston assembly has failed open and subsequently control the upstream valve to control the first fluid connection to operate the upstream valve to control the first fluid connection and control a position of the first piston assembly.

In another aspect, a redundant valve system to provide a regulated fluid flow includes a housing having an inlet at an inlet end which receives a pressurized fluid from a turbine engine, and an outlet at an outlet end which provides the regulated fluid flow of the pressurized fluid from the turbine engine, a first piston assembly arranged in the housing having a first cavity, the first piston assembly configured to regulate the fluid flow, a first fluid connection connected to the first cavity and to a point along the housing at the outlet end, a second piston assembly arranged in the housing downstream of the first piston assembly having a second cavity, the second cavity having a second fluid connection to a vent, the second piston assembly configured to regulate the fluid flow when the first piston assembly fails, an upstream valve to control the first fluid connection and control a position of the first piston assembly, and a downstream valve to control the second fluid connection and control a position of the second piston assembly, wherein the upstream valve is configured to close the first fluid connection, and wherein the downstream valve may is configured to close the second fluid connection.

The redundant valve system may further include a regulator servo in fluid connection with the first cavity, and a regulator bellow in fluid connection with the regulator servo and the point along the housing at the outlet end, wherein the regulator servo may be actuated to control the regulator bellow. The redundant valve system may further include a relief valve in fluid connection with the second cavity. The vent may outlet to the atmosphere. The first piston assembly may further include an orifice, wherein the orifice fluidly connects the inlet and the first cavity. The housing may further include a third cavity between the first piston assembly and the second piston assembly. The second piston assembly may further include an orifice, wherein the orifice fluidly connects the second cavity and the third cavity. The upstream valve may be a solenoid operated valve. The downstream valve may be a solenoid operated valve. The redundant valve system may further include a controller configured to operate the downstream valve to control the second fluid connection and control a position of the second piston assembly, and the controller may be further configured to determine when the second piston assembly has failed open and subsequently control the upstream valve to control the first fluid connection to operate the upstream valve to control the first fluid connection and control a position of the first piston assembly.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

DETAILED DESCRIPTION

Pressure regulating valves have applications in a wide variety of areas that use pressurized fluids to drive pneumatic systems. These systems typically require one or more pressure regulating valves controlled through electronic systems to permit operation remotely. One application for these pressure regulating valves are in aircraft systems that utilize turbine engines.

Due to the cold conditions during flight, aircraft often use bleed air from the turbine engines in order to perform de-icing of the exterior portions of the aircraft such as engine cowls, wings, and the like. This bleed air can also be used to maintain cabin pressurization, de-ice windows, maintain temperature of the cabin and luggage compartments, assist in the function of ejector seats, provide air for blown flaps, provide air for windshield blow mechanisms, and the like. For example, the de-icing of the engine cowls typically requires pressure regulating valves to regulate the bleed air to compensate for variations in throttle settings, icing conditions and the like in order to allow the system to be controlled automatically or from the aircraft cockpit. These valves need to be reliable in performance, low in weight, and compact in size. It is also preferable that these valves are self-powered by using the pressure generated within the system itself for supplying the energy to actuate the valve.

Reference in this specification to "one aspect," "an aspect," "other aspects," "one or more aspects," or the like means that a particular feature, structure, or characteristic described in connection with the aspect is included in at least one aspect of the disclosure. The appearance of, for example, "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
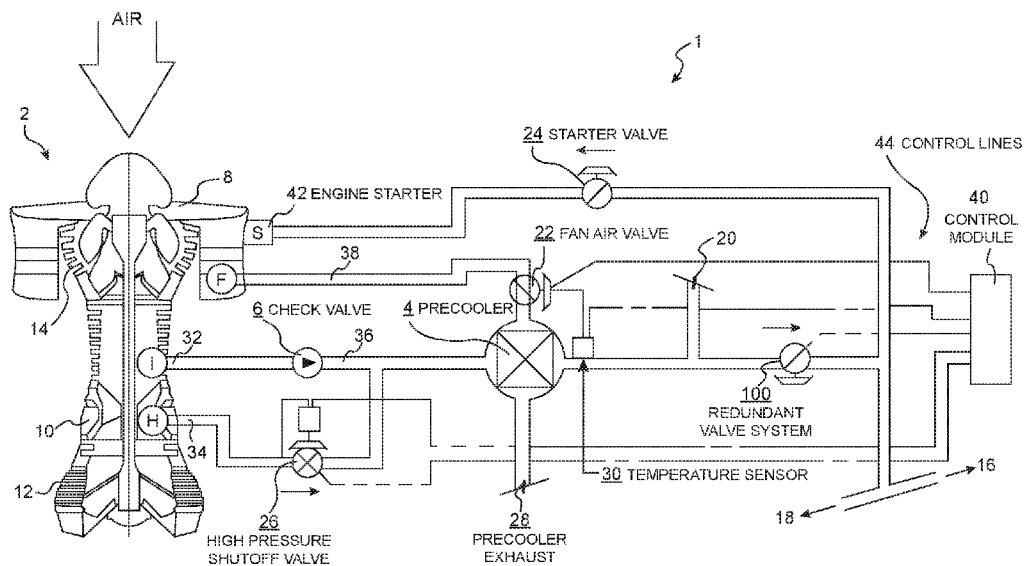
FIG. 1 illustrates a turbine engine schematic with bleed air that is siphoned from the turbine engine in accordance with an aspect of the disclosure.

FIG. 1 illustrates a system 1 that may include a turbine engine 2 and fluid connections where bleed air from the turbine engine 2 is siphoned off and utilized for other purposes. The turbine engine 2 may be a turbojet engine, a turboprop engine, a turboshaft engine, a propfan engine, or another airbreathing jet engine known in the art. As air enters the turbine engine 2 at the fan 8, the air travels through a compressor 14 where the air becomes heated and pressurized to, for example, temperatures around 1250° F. and pressures around 350 psi. A portion of the air that passes through the compressor 14 may be siphoned off at an outlet 32 and/or an outlet 34.

The turbine engine 2 may be in fluid connection with a first check valve 6 along a conduit 36. Subsequently, there may be a precooler 4 to cool a portion of the bleed air with air from the compressor 14 and/or air from the fan 8 provided by a conduit 38. Subsequently, the bleed air enters the redundant valve system 100, which regulates the flow of bleed air based on pressure and directs it for other purposes such as de-icing the engine cowl, the wings, or the like at outlet 16 and/or outlet 18. The bleed air may also be provided through outlet 20. This bleed air can also be used to maintain cabin pressurization, de-ice windows, maintain temperature of the cabin and luggage compartments, assist in the function of ejector seats, blow rainwater off the windshield, blow the flaps, and the like.

Although the redundant valve system 100 is illustrated in FIG. 1 as being downstream of a precooler 4. In some applications, the precooler 4 may not be necessary and the redundant valve system 100 may be directly connected to the turbine engine 2 to siphon air pressurized by the compressor 14.

The system 1 may further include an engine starter 42, a high-pressure shutoff valve 26, a precooler exhaust 28, and a fan air valve 22. The system 1 may further include a controller implemented as a control module 40.

The control module 40 may sense the temperature from a temperature sensor 30, may sense pressure in numerous areas of the redundant valve system 100, may sense temperature in numerous areas of the redundant valve system 100, may sense positions of components of the redundant valve system 100, may control the fan air valve 22, and may control the high-pressure shutoff valve 26. The control module 40 may further control the redundant valve system 100. The control module 40 may be implemented with dedicated hardware as defined herein and control system components and/or receive sensor inputs with control lines 44. The control module 40 may sense when a valve of the redundant valve system 100 has failed and further control a second valve of the redundant valve system 100.

Figure 2:
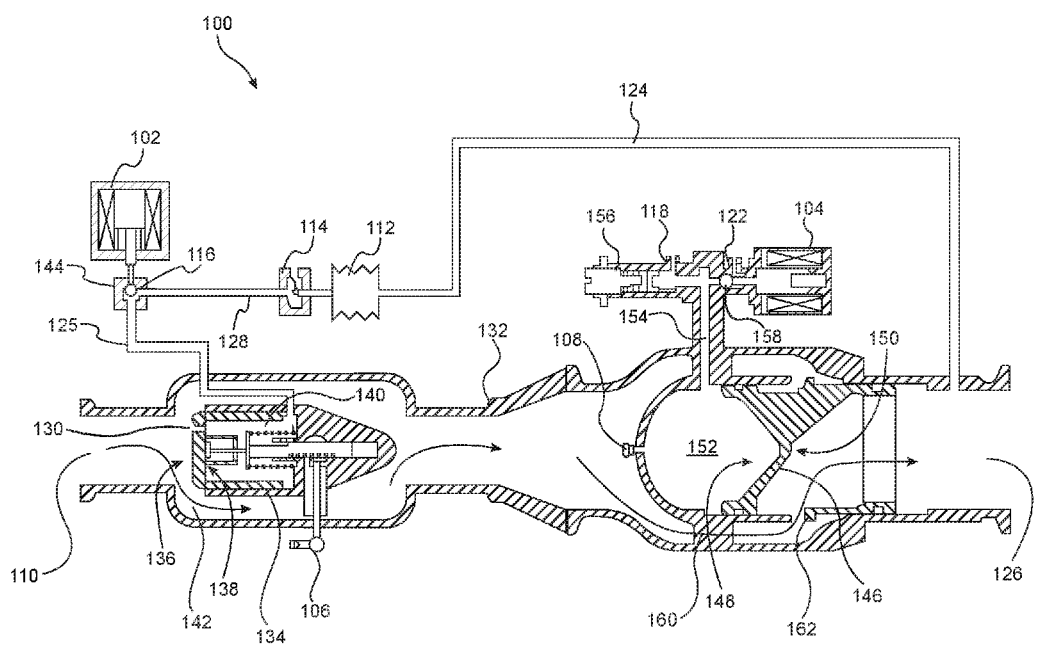
FIG. 2 illustrates the redundant valve system with the downstream valve regulating and open in accordance with an aspect of the disclosure.

FIG. 2 illustrates the redundant valve system 100 with the downstream valve 104 regulating and open in accordance with an aspect of the disclosure. The redundant valve system 100 may include a housing 132 having an inlet 110 and an outlet 126. The outlet 126 may subsequently connect to the outlet 16 and/or the outlet 18 shown in FIG. 1. Towards the inlet 110 end of the housing 132, there is a first piston assembly 134. The first piston assembly 134 may move longitudinally along a center line of the housing 132. The first piston assembly 134 may have a first cavity 140, which is in fluid connection with the outlet 126. The first cavity 140 may be connected fluidly with the outlet 126 through the connection 125, the regulator servo 114, the regulator bellows 112, and the connection 124. The first piston assembly 134 may also include a control orifice 130, which provides pneumatic connection between the inlet 110 and the first cavity 140 of the first piston assembly 134.

Figure 5:
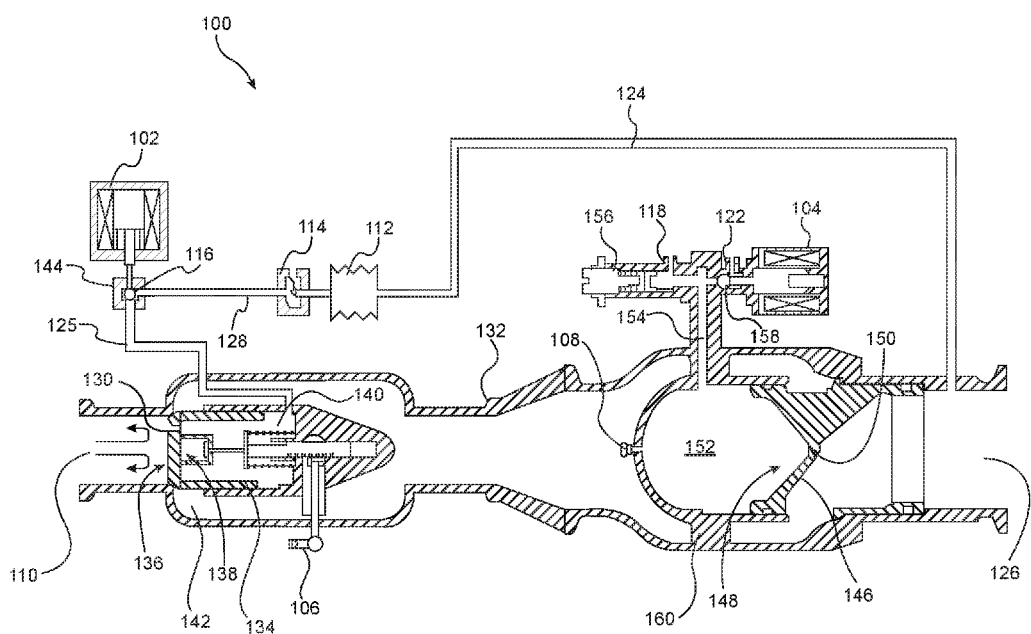
FIG. 5 illustrates the redundant valve system with the upstream valve closed in accordance with an aspect of the disclosure.

Along the connection 125, there may be an upstream valve 102. The upstream valve 102 may be a solenoid operated valve or some other similar valve known in the art. The upstream valve 102 may be actuated such that the ball 116 rests in the ball cavity 144 and does not block the connection 125. The upstream valve 102 may also be actuated such that the ball 116 moves down through the connection 125 and blocks the connection 125 to close the upstream valve 102 as shown in FIG. 5.

The redundant valve system 100 may also include a second piston assembly 146 towards the outlet 126 end of the redundant valve system 100. The second piston assembly 146 may move longitudinally along a center line of the housing 132. The second piston assembly 146, which may receive the flow of bleed air through the inlet orifice 108. The second piston assembly 146 has a second cavity 152 as well as an interior face 148 and an exterior face 150. The second cavity 152 is in fluid connection with two vents 118 and 122 through connection 154. The two vents 118 and 122 vent to atmospheric pressure conditions. Under normal operation, the relief valve 156 is closed and the vent 118 is blocked. When situations where the pressure in the second cavity 152 becomes too great, the relief valve 156 may be actuated in order to change the regulation level while venting through the vent 118 and reduce the pressure in the redundant valve system 100. The vent 122 may be controlled by the downstream valve 104.

The downstream valve 104 may be a solenoid operated valve or another similar valve known in the art. When the downstream valve 104 is not used to regulate the bleed air through the redundant valve system 100, the ball 158 blocks the connection from the second cavity 152 to the vent 122. When the downstream valve 104 is in operation, the ball 158 may be actuated by the downstream valve 104 to cause the ball 158 to extend with the downstream valve 104 and second cavity 152 through connection 154 out to vent 122. (See FIG. 3).

Under normal operation, the downstream valve 104 may be used to shut-off or otherwise control the flow of bleed air through the redundant valve system 100. The redundant valve system 100 may receive unregulated bleed air at the inlet 110 and provide a regulated flow of bleed air at the outlet 126. When the downstream valve 104 is used to shut-off or otherwise control the flow of bleed air, the upstream valve 102 is actuated such that the ball 116 rests in the ball cavity 144. The bleed air received at the inlet typically may have a temperature of around 1250° F. with a pressure of approximately 350 psi for example. As bleed air enters from the inlet 110, it flows through the control orifice 130. The pressure from the bleed air acts on the first face 136 and second face 138 of the first piston assembly 134.

When the upstream valve 102 actuated such that the ball 116 does not block the connection 125, there is a fluid connection between the inlet 110 and the outlet 126 through the connection 125 through the regulator servo 114, the regulator bellows 112, and the connection 124. Because the outlet 126 is at a lower pressure than the inlet 110, the pressure on the first face 136 may be greater than the pressure forces on the second face 138 and inside the first cavity 140 of the first piston assembly 134. Due to this difference in pressure force, the first piston assembly 134 is actuated towards the outlet 126 of the redundant valve system 100, creating a passageway 142. The bleed air will be able to flow from through inlet 110 through the passageway 142 towards the second piston assembly 146.

When it is desired to have bleed air exit from the outlet 126, the downstream valve 104 is actuated such that the ball 158 will block the vent 122, which would otherwise outlet to atmospheric pressure conditions. The fluid connection between the second cavity 152 through the connection 154 and to the vent 122 will be closed. Bleed air from the inlet 110 will flow in through the inlet orifice 108 into the second cavity 152 of the second piston assembly 146. The pressure on the interior face 148 will be greater than on the exterior face 150, and will cause the second piston assembly 146 to be actuated towards the outlet 126. This will create a passageway for bleed air at the entrance 162. This will allow bleed air to flow through the passageway 160 through the entrance 162 and out of the outlet 126.

The fluid connection between the inlet 110 and the outlet 126 may also act as a feedback mechanism to control the flow of bleed air through the redundant valve system 100. This may be desirable when the second piston assembly 146 is locked open or if it fails to restrict the flow of air through passageway 160 below the relief pressure set by the relief valve 156. When the flow of bleed air out of the redundant valve system 100 increases, the pressure at the outlet 126 will also increase. The connections 124 and 125 create a feedback passage into the first cavity 140. An increase in the pressure at the outlet 126 will increase the pressure inside the first cavity 140 and create a retarding force onto the second face 138 of the first piston assembly 134. The first piston assembly 134 may be actuated towards the inlet and restrict the flow of bleed air through the passageway 142.

The regulator servo 114 and regulator bellows 112 may also be used to control the feedback pressure in the first cavity 140. The regulator servo 114 may be an electrofluid servo valve, which receives an analog or digital input signal to actuate the regulator bellows 112 from the control module 40. The regulator bellows 112 may be used to control the regulator servo 114 in adjusting the feedback pressure through the connections 124 and 125 from the outlet 126. The regulator bellows 112 may be actuated to decrease or increase feedback pressure from the outlet 126 depending on the desired flow of bleed air through the redundant valve system 100.

Figure 3:
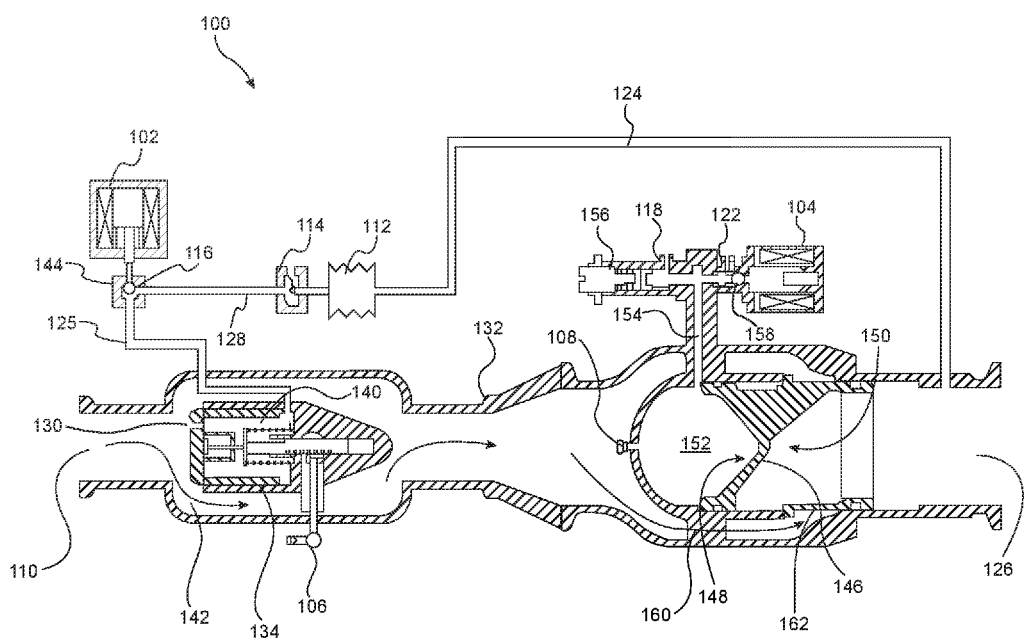
FIG. 3 illustrates the redundant valve system with the downstream valve closed in accordance with an aspect of the disclosure.

FIG. 3 illustrates the redundant valve system 100 when the downstream valve 104 is actuated to shut-off or otherwise control the flow of bleed air in accordance with an aspect of the disclosure. When the downstream valve 104 is used to relieve the flow of bleed air and it is desired to stop the flow of bleed air through the outlet 126, the downstream valve 104 will be actuated such that the ball 158 will be actuated towards the downstream valve 104, opening the fluid connection between the second cavity 152 to the vent 122. Because the vent 122 outlets to atmospheric pressure, the pressure inside the second cavity 152 will be less than the pressure at the outlet 126. The pressure on the exterior face 150 of the second piston assembly 146 will be greater than the pressure on the interior face 148 of the second piston assembly 146. The second piston assembly 146 will be actuated towards the inlet 110 end of the redundant valve system 100. This will close the entrance 162 and restrict the flow of bleed air past the second piston assembly 146.

In some previous designs, there was a fluid connection between the first cavity 140 and a point along the housing 132 between the first piston assembly 134 and the second piston assembly 146. In this situation, the pressure of the feedback bleed air into the first cavity 140 would be relatively high. This would cause the first piston assembly 134 to close, which would stop the flow of bleed at the inlet 110. In turn, this would drop the pressure at the fluid connection point and cause the first piston assembly 134 to open again. The process would repeat causing oscillations in the opening/closing of the first piston assembly 134, which unnecessary introduced extra wear and tear on the system. By establishing a fluid connection with the outlet 126 through the connections 124 and 125, the pressure of the outlet 126 remains significantly lower than the pressure at the inlet 110. This prevents the first piston assembly 134 from unnecessarily opening and closing due to the pressure within the first cavity 140.

Figure 4:
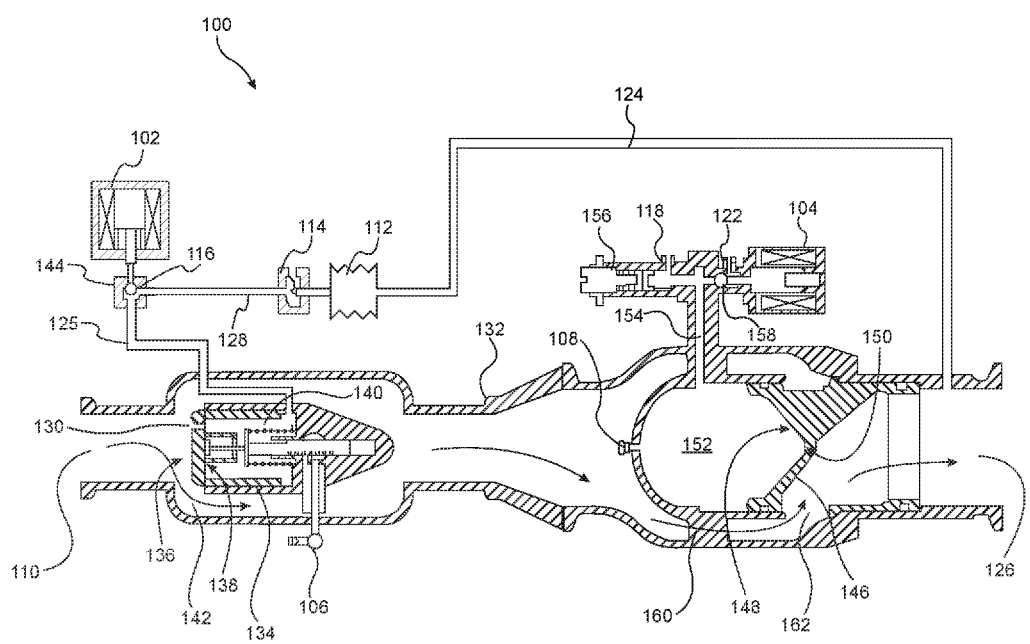
FIG. 4 illustrates the redundant valve system with the upstream valve open in accordance with an aspect of the disclosure.

FIG. 4 illustrates the redundant valve system 100 with the upstream valve 102 actuated to allow the flow of bleed air in accordance with an aspect of the disclosure. In the event of failure of the second piston assembly 146, the second piston assembly 146 will fail open. The passageway 160 may permit the flow of bleed air past the second piston assembly 146. Because of the fluid connection between the first cavity 140 and the outlet 126, the pressure within first cavity 140 will be lower compared to the pressure at the inlet 110. The pressure on the first face 136 will be greater than the pressure on the second face 138, which will actuate the first piston assembly 134 into an open position. This will permit the bleed air to flow through the passageway 142. The bleed air will continue past the second piston assembly 146 through the passageway 160 and out of the outlet 126.

FIG. 5 illustrates the redundant valve system 100 when the upstream valve 102 is actuated to control the flow of bleed air in accordance with an aspect of the disclosure. When it is desired to restrict the flow of bleed air out of the outlet 126, the upstream valve 102 may be actuated to cause the ball 116 to block the connection 125. By blocking the connection 125, the fluid connection between the first cavity 140 and the outlet 126 may be closed. Now, when the bleed air flows from the inlet 110 through the control orifice 130 and into the first cavity 140, the pressure inside the first cavity 140 will be roughly equivalent to the pressure at the inlet 110. The pressure on the first face 136 will be roughly equivalent to the pressure on the second face 138. Due to the larger surface area of the second face 138, the first piston assembly 134 may be actuated towards the inlet and seal the passageway 142. By sealing the passageway 142, the flow of bleed air from the inlet 110 through the redundant valve system 100 will be stopped.

Accordingly, a redundant pressure regulating valve system that is resistant to oscillation of the valves while also being compact and light weight has been disclosed. The bleed air controlled by the redundant pressure regulating valve system may be used to de-ice cowls, maintain cabin pressurization, de-ice windows, maintain temperature of the cabin and luggage compartments, assist in the function of ejector seats, provide air for blown flaps, provide air for windshield blow mechanisms, and the like. The disclosed valves are reliable in performance, low in weight, and compact in size. These valves may be self-powered by using the pressure generated within the system itself for supplying the energy to actuate the valve.

Further in accordance with various aspects of the disclosure, the methods described herein are intended for operation with dedicated hardware implementations including, but not limited to, processors, microprocessors, computers, PCs, semiconductors, application specific integrated circuits (ASIC), programmable logic arrays, cloud computing devices, and other hardware devices constructed to implement the methods described herein.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A redundant valve system to provide a regulated fluid flow, comprising:
    a housing having an inlet at an inlet end which receives a pressurized fluid, and an outlet at an outlet end which provides the regulated fluid flow;
    a first piston assembly arranged in the housing having a first cavity, the first piston assembly configured to regulate the fluid flow;
    a first fluid connection connected to the first cavity and to a point along the housing at the outlet end;
    a second piston assembly arranged in the housing downstream of the first piston assembly having a second cavity, the second cavity having a second fluid connection to a vent, the second piston assembly configured to regulate the fluid flow when the first piston assembly fails;
    an upstream valve to control the first fluid connection and control a position of the first piston assembly; and
    a downstream valve to control the second fluid connection and control a position of the second piston assembly,
    wherein the upstream valve is configured to close the first fluid connection, and
    wherein the downstream valve is configured to close the second fluid connection.

2. The redundant valve system of claim 1, further comprising:
    a regulator servo in fluid connection with the first cavity; and a regulator bellows in fluid connection with the regulator servo and the point along the housing at the outlet end,
wherein the regulator servo may be actuated to control the regulator bellows.

3. The redundant valve system of claim 1, further comprising a relief valve in fluid connection with the second cavity.

4. The redundant valve system of claim 1, wherein the vent outlets to the atmosphere.

5. The redundant valve system of claim 1, wherein the first piston assembly further comprises an orifice, wherein the orifice fluidly connects the inlet and the first cavity.

6. The redundant valve system of claim 1, wherein the housing further comprises a third cavity between the first piston assembly and the second piston assembly.

7. The redundant valve system of claim 6, wherein the second piston assembly further comprises an orifice, wherein the orifice fluidly connects the second cavity and the third cavity.

8. The redundant valve system of claim 1, wherein the upstream valve is a solenoid operated valve.

9. The redundant valve system of claim 1, wherein the downstream valve is a solenoid operated valve.

10. The redundant valve system of claim 1, further comprising a controller configured to operate the downstream valve to control the second fluid connection and control a position of the second piston assembly; and
the controller further configured to determine when the second piston assembly has failed open and subsequently control the upstream valve to control the first fluid connection to operate the upstream valve to control the first fluid connection and control a position of the first piston assembly.

11. A redundant valve system to provide a regulated fluid flow, comprising:
a housing having an inlet at an inlet end which receives a pressurized fluid from a turbine engine, and an outlet at an outlet end which provides the regulated fluid flow of the pressurized fluid from the turbine engine;
a first piston assembly arranged in the housing having a first cavity, the first piston assembly configured to regulate the fluid flow;
a first fluid connection connected to the first cavity and to a point along the housing at the outlet end;
a second piston assembly arranged in the housing downstream of the first piston assembly having a second cavity, the second cavity having a second fluid connection to a vent, the second piston assembly configured to regulate the fluid flow when the first piston assembly fails;
an upstream valve to control the first fluid connection and control a position of the first piston assembly; and
a downstream valve to control the second fluid connection and control a position of the second piston assembly,
wherein the upstream valve is configured to close the first fluid connection, and
wherein the downstream valve is configured to close the second fluid connection.

12. The redundant valve system of claim 11 further comprising:
a regulator servo in fluid connection with the first cavity; and
a regulator bellows in fluid connection with the regulator servo and the point along the housing at the outlet end,
wherein the regulator servo may be actuated to control the regulator bellows.

13. The redundant valve system of claim 11, further comprising a relief valve in fluid connection with the second cavity.

14. The redundant valve system of claim 11, wherein the vent outlets to the atmosphere.

15. The redundant valve system of claim 11, wherein the first piston assembly further comprises an orifice, wherein the orifice fluidly connects the inlet and the first cavity.

16. The redundant valve system of claim 11, wherein the housing further comprises a third cavity between the first piston assembly and the second piston assembly.

17. The redundant valve system of claim 16, wherein the second piston assembly further comprises an orifice, wherein the orifice fluidly connects the second cavity and the third cavity.

18. The redundant valve system of claim 11, wherein the upstream valve is a solenoid operated valve.

19. The redundant valve system of claim 11, wherein the downstream valve is a solenoid operated valve.

20. The redundant valve system of claim 11, further comprising a controller configured to operate the downstream valve to control the second fluid connection and control a position of the second piston assembly; and
the controller further configured to determine when the second piston assembly has failed open and subsequently control the upstream valve to control the first fluid connection to operate the upstream valve to control the first fluid connection and control a position of the first piston assembly.

* * * * *